US012759728B2

(12) United States Patent
Hwang

(10) Patent No.: US 12,759,728 B2
(45) Date of Patent: Oct. 13, 2026

(54) AIRCRAFT WITH EMERGENCY LANDING POINT WARNING SYSTEM

(71) Applicants: Hyundai Motor Company, Seoul (KR); Kia Corporation, Seoul (KR)

(72) Inventor: Eu Gene Hwang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 225 days.

(21) Appl. No.: 18/619,757

(22) Filed: Mar. 28, 2024

(65) Prior Publication Data

US 2025/0178742 A1 Jun. 5, 2025

(30) Foreign Application Priority Data

Dec. 5, 2023 (KR) ........................ 10-2023-0174559

(51) Int. Cl.
*B64D 45/08* (2006.01)

(52) U.S. Cl.
CPC .................................... *B64D 45/08* (2013.01)

(58) Field of Classification Search
CPC ........ B64D 45/08; B64D 45/00; B64D 47/02; B64D 47/06; G08B 3/10; G08B 5/36
See application file for complete search history.

(56) References Cited

U.S. PATENT DOCUMENTS

| | | | | | |
|---|---|---|---|---|---|
| 6,161,798 | A * | 12/2000 | Van Sise, Jr. | .......... | B64D 25/00 244/1 R |
| 2016/0318615 | A1 | 11/2016 | Pick | | |
| 2019/0014461 | A1* | 1/2019 | Winkle | .................... | G08G 5/57 |
| 2020/0193729 | A1* | 6/2020 | Nilsson | ...................... | B64F 5/60 |
| 2020/0410878 | A1* | 12/2020 | Tachiiwa | ................. | G08G 5/76 |
| 2021/0107643 | A1* | 4/2021 | Nagai | .................... | B64D 25/00 |
| 2021/0347498 | A1 | 11/2021 | Kamat et al. | | |

FOREIGN PATENT DOCUMENTS

| | | | | | |
|---|---|---|---|---|---|
| JP | 2021086387 | A * | 6/2021 | | |
| JP | 2021185072 | A | 12/2021 | | |
| KR | 20110108666 | A | 10/2011 | | |
| KR | 102019863 | B1 | 9/2019 | | |
| KR | 102366602 | B1 | 2/2022 | | |
| KR | 102550907 | B1 | 7/2023 | | |
| KR | 102555898 | B1 * | 7/2023 | ............. | B64D 45/04 |

* cited by examiner

*Primary Examiner* — Tara Schimpf
(74) *Attorney, Agent, or Firm* — Slater Matsil, LLP

(57) ABSTRACT

An embodiment aircraft includes an aircraft body including a fuselage, a status information detection device disposed in or on the aircraft body, a controller disposed in or on the aircraft body and configured to determine whether an emergency landing situation exists based on aircraft status information detected by the status information detection device and, in response to a determination that the emergency landing situation exists, calculate an expected emergency landing point, and an external output device disposed in or on the aircraft body and configured to output warning information toward the expected emergency landing point, wherein the warning information includes a sound or a light.

20 Claims, 4 Drawing Sheets

AIRCRAFT WITH EMERGENCY LANDING POINT WARNING SYSTEM

CROSS-REFERENCE TO RELATED APPLICATIONS

This application claims the benefit of Korean Patent Application No. 10-2023-0174559, filed on Dec. 5, 2023, which application is hereby incorporated herein by reference in its entirety.

TECHNICAL FIELD

The present disclosure relates to an aircraft equipped with an emergency landing point warning system.

BACKGROUND

Aircraft use a ground proximity warning system (GPWS) to provide a warning alarm to the pilot operating an aircraft when the aircraft approaches the ground below a certain altitude. However, even if such devices are used, it may be difficult to secure time to move to a safe area outside the aircraft or on the ground to avoid approaching aircraft during an emergency landing.

Recently, an urban air mobility (UAM) vehicle for future transportation and transportation systems has been under development. Such a UAM vehicle is an aircraft capable of vertical takeoff and landing and is mainly operated in urban areas with a high density of vehicles and population.

Likewise, in the case of a UAM vehicle operating in the city, a UAM vehicle may cause significant damage to other vehicles and people in the area when approaching the ground due to an emergency landing. Therefore, in the event of an emergency landing of an aircraft operating in the city, such as a UAM vehicle, in order to significantly reduce damage on the ground, a device or method is required to warn of emergency landing points in advance and to encourage the evacuation of nearby vehicles and people.

SUMMARY

An embodiment of the present disclosure provides an aircraft that may calculate an expected emergency landing point based on aircraft status information and provide a warning to the emergency landing point.

According to an embodiment of the present disclosure, an aircraft includes a status information detection unit detecting aircraft status information, a control unit determining whether an emergency landing situation exists based on the aircraft status information and calculating an expected emergency landing point; an external output unit outputting warning information toward the emergency landing point, using at least one of sound and light, and a fuselage provided with the status information detection unit, the control unit, and the external output unit on at least a portion of an interior and an exterior.

The status information detection unit may include a plurality of sensors detecting the aircraft status information, and the plurality of sensors may be provided to detect or measure at least one of a position of the aircraft, an attitude of the aircraft, an altitude of the aircraft, a speed of the aircraft, acceleration of the aircraft, and atmospheric information outside the aircraft.

The control unit may be set to calculate the emergency landing point using the aircraft status information in the case of an emergency landing situation.

The external output unit may include an audio device outputting sound and a lighting device outputting light.

The audio device and the lighting device may be installed on a lower portion of the fuselage to be located outside the fuselage.

The external output unit may further include a driving device connecting the audio device and the lighting device to the fuselage, a direction of the audio device and the lighting device may be adjusted based on driving of the driving device, and the control unit may transmit a control signal to the driving device to direct the audio device and the lighting device toward the emergency landing point.

The control unit may include a determination unit determining whether an emergency landing situation exists and a calculation unit calculating the emergency landing point.

The control unit may deliver warning information to other aircraft located around the aircraft or to external devices located near the emergency landing point.

The external devices located near the emergency landing point may include at least one of a car driving near the emergency landing point and a portable terminal device of a pedestrian walking near the emergency landing point.

According to an embodiment of the present disclosure, a method of warning an emergency landing point of an aircraft includes detecting aircraft status information, determining whether an emergency landing situation exists based on the aircraft status information, calculating an expected emergency landing point based on the aircraft status information, adjusting a direction of an external output unit to be directed toward the emergency landing point, and controlling to output warning information toward the emergency landing point using the external output unit.

The external output unit may output the warning information using at least one of sound and light.

The aircraft status information may include at least one of a location of the aircraft, an attitude of the aircraft, an altitude of the aircraft, a speed of the aircraft, acceleration of the aircraft, and atmospheric information outside the aircraft.

The calculating the emergency landing point may be performed by calculating a predetermined position in which an emergency landing of the aircraft is expected in a current state, using the aircraft status information, when it is confirmed that the aircraft is in the emergency landing situation.

The method of warning an emergency landing point of an aircraft may further include transmitting the emergency landing point to an integrated control center and transmitting the warning information to external devices and external facilities near the emergency landing point.

The transmitting the emergency landing point to the integrated control center may be performed after the emergency landing point is calculated and is performed independently of adjusting a direction of the external output unit.

The transmitting the warning information to the external devices and the external facilities may be performed by the integrated control center receiving information about the emergency landing point from the aircraft.

The external devices and the external facilities may include at least one of other aircraft around the aircraft undergoing an emergency landing, cars located near the emergency landing point, portable devices of pedestrians located near the emergency landing point, and warning facilities near the emergency landing point.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Figure 1:
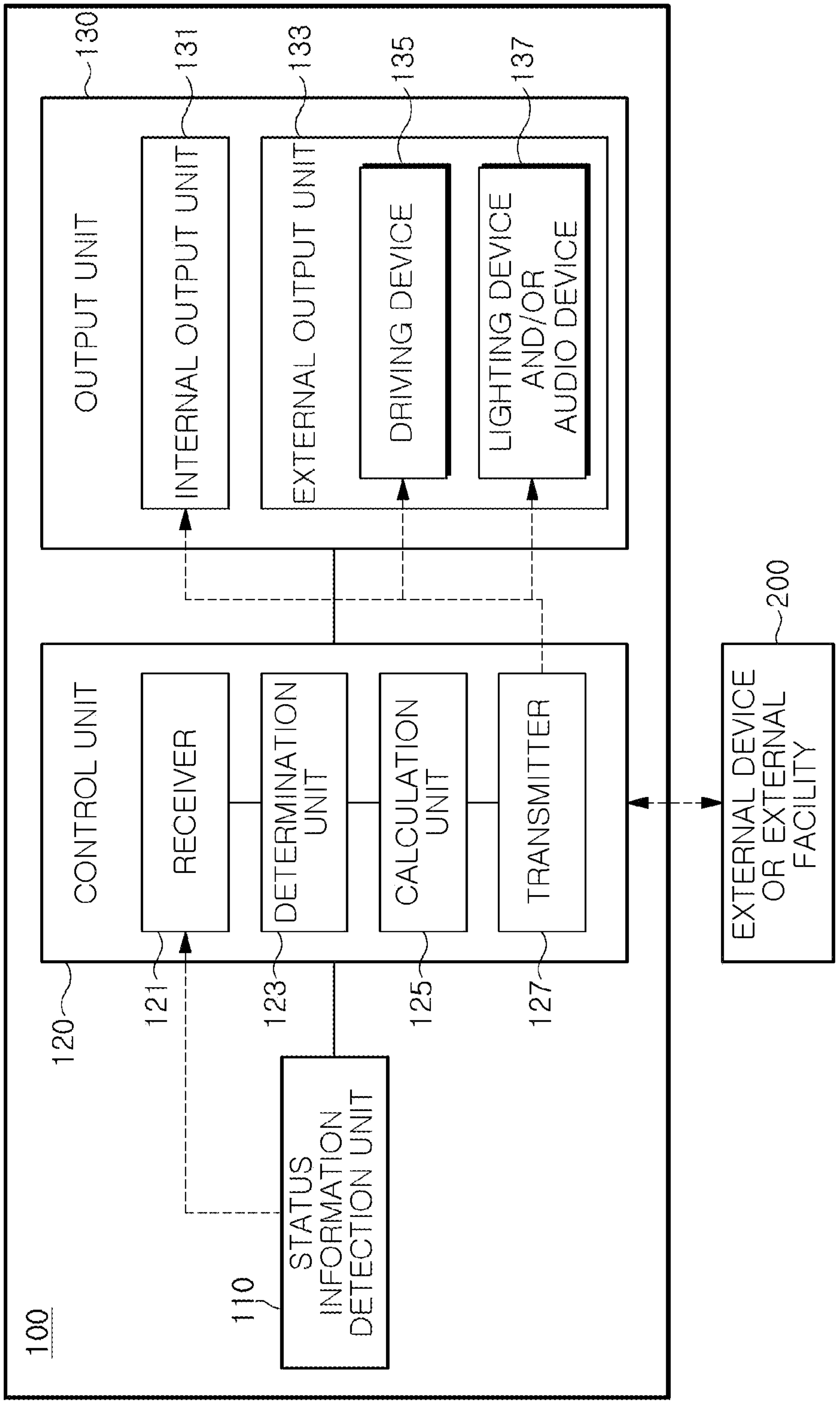
FIG. 1 illustrates a block diagram of an aircraft equipped with an emergency landing point warning system according to an embodiment.

Since the present disclosure may make various changes and have various embodiments, some embodiments are illustrated in the drawings and described in detail. However, this is not intended to limit the present disclosure to the embodiments, and the present disclosure should be understood to include all modifications, equivalents, and substitutes included in the spirit and scope of the present disclosure.

Terms such as first and second may be used to describe various components, but the components should not be limited by the terms. These terms are only used for distinguishing one component from another. For example, a first element may be termed a second element, and similarly, a second element may be termed a first element, without departing from the scope of the present disclosure. The term 'and/or' includes a combination of a plurality of related recited items or any one of a plurality of related recited items.

Terms used in this specification are only used to describe embodiments and are not intended to limit the present disclosure. Singular expressions include plural expressions unless the context clearly dictates otherwise. In this application, the terms "include," "have," and the like are intended to designate that there is a feature, number, step, operation, component, part, or combination thereof described in the specification, but it should be understood that it does not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless expressly defined in this application, they are not to be construed in an ideal or overly formal sense.

In this specification, an aircraft may mean a mobility vehicle that may move by flying in the sky. For example, for an aircraft, in addition to referring to helicopters, drones, tilt rotors, fixed-wing airplanes, etc., aircraft may also include vehicles that move on the ground using wheels and the like and may then fly with the wheels and the like separated from the ground. Additionally, aircraft may include manned aircraft and unmanned aircraft. Manned aircraft may include an airframe that may operate autonomously in addition to an airframe controlled by a pilot.

Hereinafter, embodiments will be described with reference to the drawings.

Figure 2:
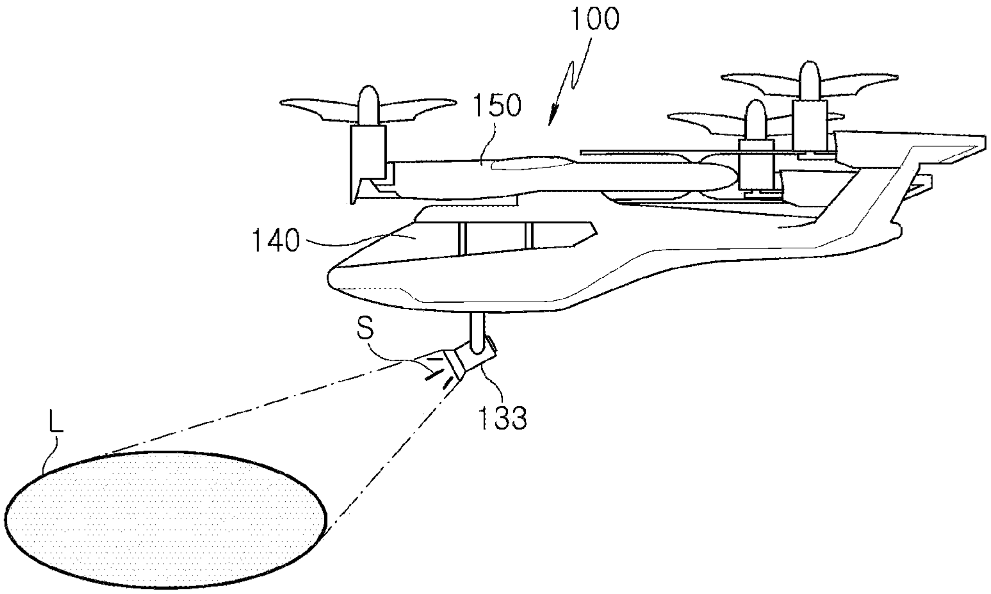
FIG. 2 schematically illustrates an aircraft equipped with an emergency landing point warning system according to an embodiment.

FIG. 1 illustrates a block diagram of an aircraft 100 equipped with an emergency landing point warning system according to an embodiment. FIG. 2 schematically illustrates the aircraft 100 equipped with an emergency landing point warning system according to an embodiment.

FIG. 1 is a block diagram of components constituting an emergency landing point warning system in the aircraft 100. FIG. 2 is a diagram schematically illustrating the exterior of the aircraft 100 of FIG. 1.

The aircraft 100 according to an embodiment is a flying vehicle capable of vertical take-off and landing (VTOL) and may be an air mobility including an urban air mobility (UAM) and an advanced air mobility (AAM), but this is merely an example, and the type of the aircraft 100 is not particularly limited.

Referring to FIGS. 1 and 2, the aircraft 100 according to an embodiment may include a status information detection unit 110, a control unit 120, an output unit 130, a fuselage 140, and a wing unit 150.

The fuselage 140 and the wing unit 150 constitute the exterior of the aircraft 100, and for example, the aircraft 100 may include the fuselage 140 capable of boarding passengers and/or loading cargo and the wing unit 150 coupled to the upper part of the fuselage 140 and provided with a rotor that generates lift force.

On the other hand, the shape of the aircraft 100 is not limited to the embodiment illustrated in FIG. 2 and may be modified in various manners.

The status information detection unit 110, the control unit 120, and the output unit 130 may be provided in at least one of the fuselage 140 and the wing unit 150. For example, the status information detection unit 110, the control unit 120, and the output unit 130 may be disposed or installed inside and/or outside the fuselage 140 and/or the wing unit 150.

The status information detection unit 110, the control unit 120, and the output unit 130 may constitute an emergency landing point warning system for the aircraft 100 according to an embodiment.

The status information detection unit 110 is used to detect and sense status information of the aircraft 100 in flight and may include a plurality of sensors. In this case, the status information may include various pieces of information used to determine whether the aircraft 100 will make an emergency landing and to calculate the emergency landing point. The status information detection unit 110 may be installed within the fuselage 140.

The status information detection unit 110 may transmit the detected status information of the aircraft 100 to the control unit 120. For example, the status information detection unit 110 may detect status information of the aircraft 100 and transmit the information to a receiver 121 of the control unit 120. The status information detection unit 110 may be electrically connected to the control unit 120.

The status information detection unit 110 may detect at least one of the location of the aircraft 100, the attitude of the aircraft 100, the altitude of the aircraft 100, the speed of the aircraft 100, the acceleration of the aircraft 100, and atmospheric information outside the aircraft 100. For example, the status information detection unit 110 may include at least one of a speed sensor, an acceleration sensor, a gyro sensor, an altitude sensor, an atmospheric measurement sensor, a lidar sensor, a geomagnetic sensor that measures the Earth's magnetic force, a global positioning system (GPS), an inertial navigation system (INS), or a ground proximity warning system (GPWS) to detect status information as described above.

On the other hand, the plurality of sensors included in the status information detection unit 110 are not limited to the sensors or devices described above, and some parts may be omitted or other types of sensors/devices may be additionally included.

For example, the status information detection unit 110 may monitor the attitude of the aircraft 100 using an inertial navigation system (INS). The INS is a device that provides navigation information such as the position, speed, and attitude of the aircraft 100 by integrating acceleration and angular velocity measured through sensors. The status information detection unit 110 may calculate a roll angle, a pitch angle, and a yaw angle from the accelerometer output and the angular velocity output of the INS, and the status information detection unit 110 may monitor and detect the attitude of the aircraft 100 by continuously detecting changes in these angles.

Additionally, for example, the status information detection unit 110 may measure the altitude of the aircraft 100 using at least one of an altitude sensor, an acceleration sensor, and a global positioning system (GPS). The control unit 120 may calculate a descent rate of the aircraft 100 using the altitude value transmitted from the status information detection unit 110. The descent rate may be defined as the altitude value that changes per unit time (for example, 1 second). This descent rate may be used to determine whether the aircraft 100 is in an emergency landing situation and to predict and calculate emergency landing points.

The control unit 120 may be implemented with various processing devices, such as a microprocessor embedded with a semiconductor chip or the like capable of performing various operations or controls. The control unit 120 may control an overall operation of the emergency landing point warning system to provide a warning output through the output unit 130. For example, the control unit 120 may be merged with a higher control system (for example, a main control system) of the aircraft 100 or may be used concurrently. The control unit 120 may be electrically connected to the status information detection unit 110 (for example, a plurality of sensors).

The control unit 120 may determine whether the aircraft 100 is in an emergency landing situation based on the status information of the aircraft 100 detected by the status information detection unit 110, and the control unit 120 may be set to calculate the emergency landing point and output warning information (for example, sound or light) toward the emergency landing point using the output unit 130. The control unit 120 may be installed within the fuselage 140.

The control unit 120 may include the receiver 121, a determination unit 123, a calculation unit 125, and a transmitter 127. However, the configurations of the control unit 120 illustrated in FIG. 1 are illustrative and are not necessarily limited thereto. Some of these components may be omitted or merged, or other components may be additionally included.

The receiver 121 may receive status information of the aircraft 100 from the status information detection unit 110. Additionally, the receiver 121 may receive various pieces of information for an emergency landing of the aircraft 100 from an external device or facility 200. For example, the receiver 121 receives information to be used to designate the emergency landing point of the aircraft 100, for example, the current floating population or vehicles at the location, the area of the open space where landing is possible, and the like, from the external device or facility 200. This information may be used to specify a location that may minimize damage to the surrounding area in the event of an emergency landing.

The determination unit 123 may determine whether the aircraft 100 will make an emergency landing based on the status information of the aircraft 100 received from the status information detection unit 110. For example, the determination unit 123 may determine whether the aircraft 100 is making an emergency landing, using status information including at least one of the speed, acceleration, attitude, position, and altitude of the aircraft 100.

The calculation unit 125 may calculate and predict the emergency landing point of the aircraft 100 based on the status information of the aircraft 100 received from the status information detection unit 110. For example, when it is confirmed by the determination unit 123 that the aircraft 100 is in an emergency landing situation, the calculation unit 125 may calculate and predict the location where the aircraft 100 will make an emergency landing in an emergency landing situation, using status information including at least one of the speed, acceleration, attitude, position, and altitude of the aircraft 100.

The transmitter 127 may transmit the signal or information generated by the control unit 120 to the output unit 130 or the external device or facility 200.

The transmitter 127 may transmit an output unit control signal generated based on the determination result of the determination unit 123 and the calculation result of the calculation unit 125 to the output unit 130. For example, the control unit 120 generates an output unit control signal to control an internal output unit 131 and an external output unit 133 when the emergency landing point is calculated in an emergency landing situation, and the transmitter 127 may transmit the generated output control signal to the internal output unit 131 and the external output unit 133, respectively.

The control signal for controlling the internal output unit 131 may be a signal for outputting a notification (or warning information) about the emergency landing situation and emergency landing point to the internal output unit 131.

The control signal for controlling the external output unit 133 may be a signal for adjusting the direction and position of the external output unit 133 so that the external output unit 133 may output a warning toward the emergency landing point.

According to various embodiments, the transmitter 127 may transmit information about the emergency landing situation and emergency landing point of the aircraft 100 to the external device or facility 200. In this case, the external device may include other aircraft located around the aircraft 100, cars located near the emergency landing point, and electronic devices (for example, smartphones, smartwatches, and the like) carried by pedestrians near the emergency landing point. The external facility may include integrated control centers and warning facilities located near emergency landing points.

In addition, according to various embodiments, the transmitter 127 transmits information about the emergency landing situation and emergency landing point of the aircraft 100 to the integrated control center, and the integrated control center may also deliver warning information to other aircraft, pedestrians, and warning facilities.

The output unit 130 may output warning information to notify the emergency landing situation and emergency landing point of the aircraft 100. The output unit 130 may include the internal output unit 131 that outputs warning information inside the aircraft 100 and the external output unit 133 that outputs warning information to an emergency landing point outside the aircraft 100.

The internal output unit 131 may be provided inside the aircraft 100 to inform the pilot operating the aircraft 100 of information about the emergency landing situation and emergency landing point. The internal output unit 131 may include an internal speaker that outputs a warning notification with sound or an internal monitor and/or an internal warning light and the like that output a warning notification with visual information. However, the type of the internal output unit 131 is not limited to the above examples.

The external output unit 133 may be provided to output warning information visually and/or audibly to the emergency landing point calculated/predicted by the calculation unit 125. The external output unit 133 may be connected to the fuselage 140 of the aircraft 100 and may be provided outside the fuselage 140.

The external output unit 133 may include an output device 137, including a lighting device and/or an audio device, and a driving device 135 that is connected to the output device 137 and drives the output device 137 to change the direction.

The lighting device of the output device 137 may output warning information visually by outputting light (L) to the emergency landing point, and the audio device of the output device 137 may output warning information audibly by outputting a sound(S) to the emergency landing point.

According to an embodiment illustrated in FIG. 2, in the external output unit 133, the output device 137 is provided as an integrated lighting and audio device, so that both light and sound may be output from one output device 137. However, the illustrated embodiment is an example, and the output device 137 may also be provided as a lighting device and an audio device as separate devices, and the lighting device and the audio device may respectively be connected to the fuselage 140.

The lighting device may include a searchlight or laser, and the audio device may include a speaker (for example, a long range acoustic device (LRAD) or an acoustic hailing device (AHD)), but the types of lighting and audio devices are not particularly limited.

The driving device 135 may be connected to the output device 137 and may change the position and direction of the output device 137 so that the output device 137 is directed toward the emergency landing point. The driving device 135 may drive the output device 137 to be directed to the emergency landing point, based on the control (for example, a control signal transmitted from the transmitter 127) of the control unit 120.

Although not illustrated, the driving device 135 may include a gimbal mechanism connecting the aircraft 100 and the output device 137 and a motor (or an actuator) for moving the gimbal mechanism. However, the structure of the driving device 135 is not limited to the above-described examples.

Figure 3:
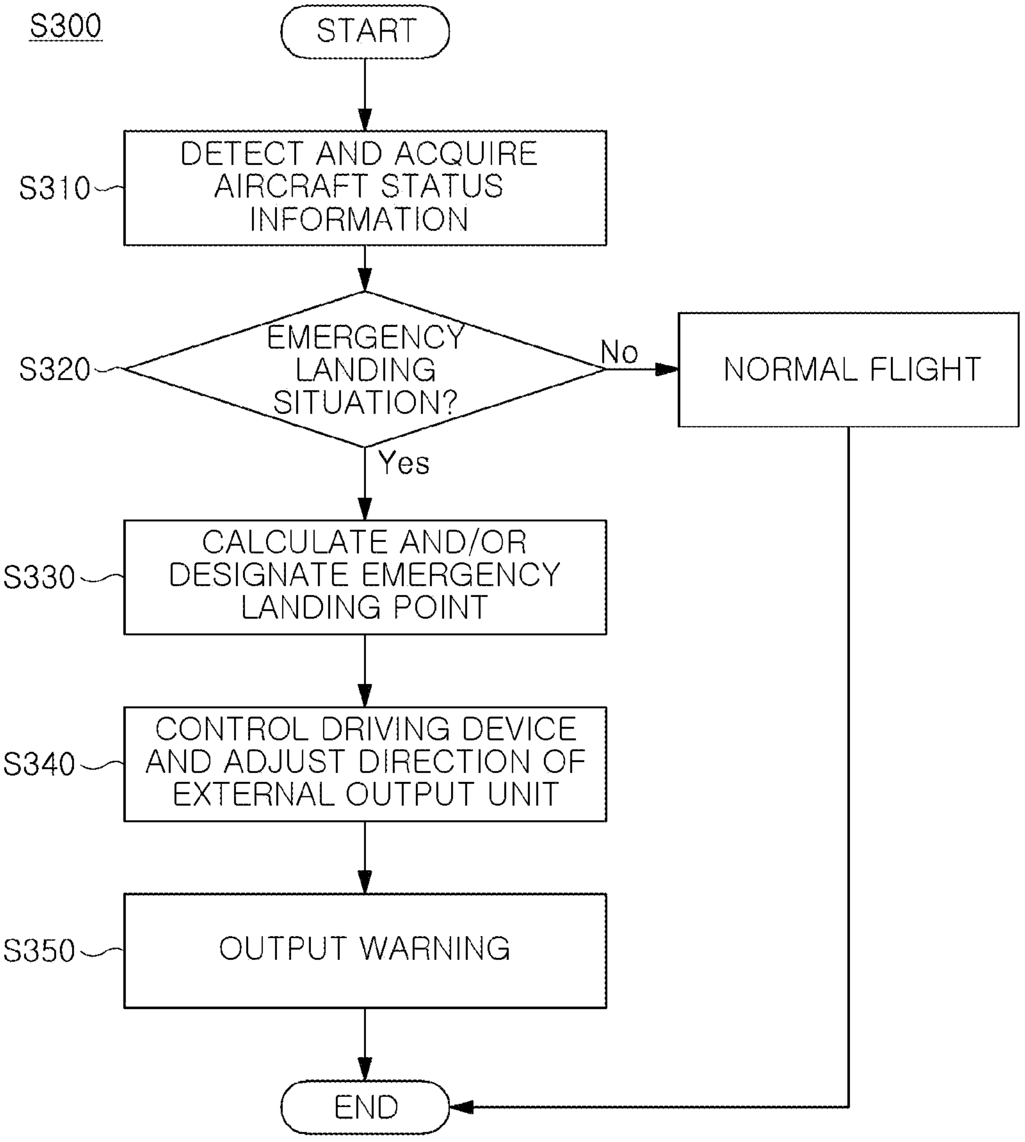
FIG. 3 illustrates a flow chart of a method of warning an emergency landing point of an aircraft according to an embodiment.

FIG. 3 illustrates a flowchart of a method S300 of warning an emergency landing point of an aircraft 100 according to an embodiment.

FIG. 3 is a flowchart illustrating the method S300 in which the aircraft 100 described with reference to FIGS. 1 and 2 transmits warning information to an emergency landing point, and some operations in FIG. 3 may be performed by at least some components of the aircraft 100 illustrated in FIGS. 1 and 2.

Hereinafter, in describing FIG. 3, FIGS. 1 and 2 will be referred to together, and content that overlaps with the previous description will be omitted.

Referring to FIG. 3, the method S300 of warning an emergency landing point of the aircraft 100 according to an embodiment may include detecting and acquiring aircraft status information (S310), determining whether an emergency landing situation exists (S320), calculating and/or designating an emergency landing point (S330), controlling a driving device to adjust the direction of the external output unit (S340), and outputting warning information using an external output unit (S350).

In the operation S310 of detecting and acquiring aircraft status information, the status information detection unit 110 may detect internal and/or external information related to the flight status of the aircraft 100 using a plurality of sensors.

In the operation S310, aircraft status information may include at least one of the location of the aircraft 100, the attitude of the aircraft 100, the altitude of the aircraft 100, the speed of the aircraft 100, the acceleration of the aircraft 100, and atmospheric information outside the aircraft 100, but it is not limited thereto and may further include various pieces of information that may be considered to determine whether the aircraft 100 will make an emergency landing and to calculate the emergency landing point.

In the operation S320 of determining whether an emergency landing situation exists, the control unit 120 may determine whether the aircraft 100 is making an emergency landing based on aircraft status information. In detail, the transmitter 127 of the control unit 120 may transmit aircraft status information from the status information detection unit 110, and the determination unit 123 of the control unit 120 may determine whether the aircraft 100 is making an emergency landing, using aircraft status information.

In the operation S320, in the case in which the aircraft 100 is not in an emergency landing situation, the aircraft 100 may perform a normal flight. When it is confirmed in the operation S320 that the aircraft 100 is in an emergency landing situation, the operation S330 is performed.

In the operation S330 of calculating and/or designating the emergency landing point, the control unit 120 may determine whether the aircraft 100 will make an emergency landing based on aircraft status information. In detail, when it is confirmed by the determination unit 123 of the control unit 120 that the aircraft 100 is currently in an emergency landing situation, the calculation unit 125 of the control unit 120 may calculate and predict the emergency landing point, which is the location where the aircraft 100 will make an emergency landing in the current state, using aircraft status information.

In the operation S330, the calculation unit 125 may calculate the emergency landing point of the aircraft 100 by comprehensively considering the effects of the altitude of the aircraft 100, the wind affecting the aircraft 100, and the like, along with the speed, acceleration, attitude, and direction of the aircraft 100. The method of calculating the emergency landing point and the information considered therefor are not particularly limited.

According to various embodiments, even in an emergency landing situation, when the landing position may be determined by controlling the aircraft 100 within a limited range, the control unit 120 may use the surrounding information received from the external device or facility 200 provided at or near the primarily calculated emergency landing point to secondarily designate a location where damage to the surrounding area may be minimized, and the control unit 120 may guide an emergency landing to the corresponding location. For example, the calculation unit 125 may be used to designate a location where damage may be minimized by considering the floating population or vehicles at the location calculated as the emergency landing point, the area of the vacant lot where landing is possible, and the like. In this case, the location designated using surrounding information transmitted from the external device or facility 200 may have a narrower range and area than the emergency landing point calculated using aircraft status information.

In the operation S340 of controlling the driving device to adjust the direction of the external output unit, the control unit 120 may control the driving device 135 of the external output unit 133 such that the output device 137 may be directed toward the emergency landing point. In detail, the control unit 120 may apply a control signal for controlling the driving device 135 to the driving device 135 of the external output unit 133 through the transmitter 127, and the driving device 135 may drive the output device 137 to be directed toward the emergency landing point, based on the control signal transmitted from the control unit 120.

In the operation S350 of outputting warning information using the external output unit, the external output unit 133 may output warning information toward the emergency landing point using a lighting device and/or an audio device. The control unit 120 may apply a control signal to the output device 137 of the external output unit 133 through the transmitter 127, and the output device 137 may provide warning information to induce evacuation to the emergency landing point, based on the control signal transmitted from the control unit 120. For example, the warning information may include a warning light (or alarm light) output from a lighting device and a warning sound (or alarm sound) output from an audio device.

Figure 4:
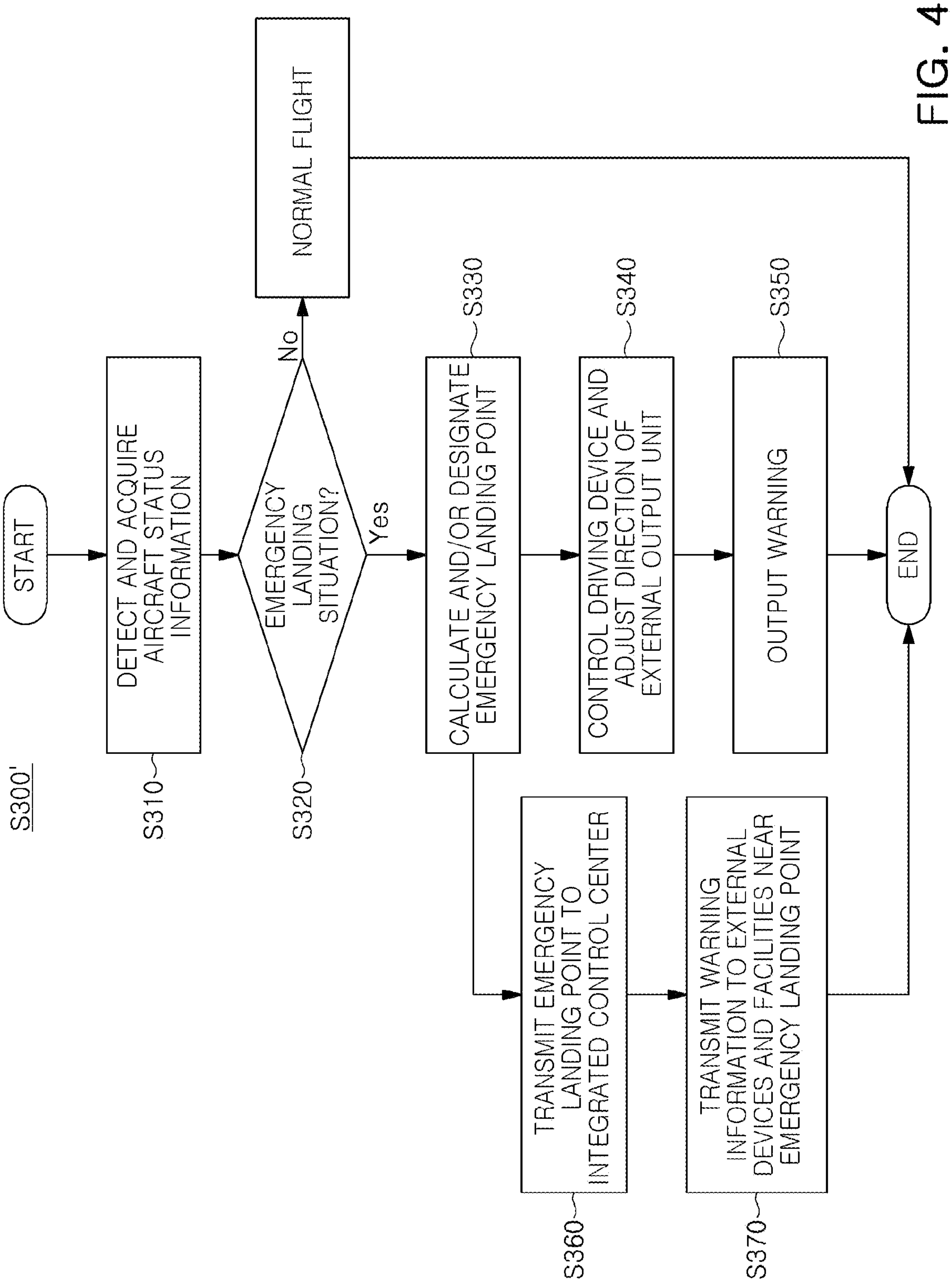
FIG. 4 illustrates a flow chart of a method of warning an emergency landing point of an aircraft according to an embodiment.

FIG. 4 illustrates a flowchart of a method (S300') of warning an emergency landing point of the aircraft 100 according to an embodiment.

The method S300' of warning an emergency landing point of FIG. 4 is a modified embodiment of the method S300 of warning an emergency landing point of FIG. 3, and an operation in which the aircraft 100 transmits warning information in conjunction with the external device or facility 200 may be included additionally or alternatively.

Referring to FIG. 4, the method S300' of warning an emergency landing point of the aircraft 100 according to an embodiment may include detecting and acquiring aircraft status information (S310), determining whether an emergency landing situation exists (S320), calculating and/or designating an emergency landing point (S330), controlling the driving device to adjust the direction of the external output unit (S340), outputting warning information using the external output unit (S350), transmitting the emergency landing point to an integrated control center (S360), and transmitting warning information to external devices/facilities near the emergency landing point (S370).

The operations S310 to S350 of FIG. 4 are the same as those described with reference to FIG. 3, and hereinafter, overlapping descriptions will be omitted and the description will focus on the added content.

In the operation S360 of transmitting the emergency landing point to the integrated control center, the control unit 120 may transmit the emergency landing point calculated in the operation S330 to the integrated control center. In detail, after the operation S330 is performed, the control unit 120 may transmit information about the emergency landing point to the integrated control center using the transmitter 127, and in this case, the integrated control center is a facility that controls the route of the aircraft 100 and the takeoff and landing of the aircraft 100, and the facility may include an area control center (ACC or an air route traffic control center (ARTCC)), an approach control, and a control tower.

In the operation S370 of transmitting warning information to external devices/facilities near the emergency landing point, the integrated control center that received information about the emergency landing point from the control unit 120 may transmit warning information to external devices and facilities. In detail, the integrated control center may deliver warning information to portable devices of pedestrians located near the emergency landing point, other aircraft around the aircraft 100 in an emergency landing, and cars located near the emergency landing point. In addition, the integrated control center may deliver warning information to warning facilities near the emergency landing point such that warning information is provided to the relevant area through an alarm device or electronic signboard located near the emergency landing point.

In addition to the operations S340 and S350, after the emergency landing point is calculated/designated in the operation S330, the operations S360 and S370 may be performed together therewith. However, according to various embodiments, the operations S360 and S370 may also be performed alternatively to the operations S340 and S350.

As set forth above, according to an example embodiment, in an aircraft emergency landing situation, damage near the emergency landing point may be reduced by calculating an expected emergency landing point based on an aircraft's status information and providing warning information using lights or speakers to the emergency landing point.

While example embodiments have been illustrated and described above, it will be apparent to those skilled in the art that modifications and variations could be made without departing from the scope of the present disclosure as defined by the appended claims.

What is claimed is:

1. An aircraft comprising:
- an aircraft body comprising a fuselage;
- a status information detection device disposed in or on the aircraft body;
- a controller disposed in or on the aircraft body and configured to:
  - determine whether an emergency landing situation exists based on aircraft status information detected by the status information detection device; and
  - in response to a determination that the emergency landing situation exists, determine an expected emergency landing point; and
- an external output device disposed in or on the aircraft body and configured to output warning information toward the expected emergency landing point, wherein the warning information comprises a sound or a light,
- wherein the status information detection device comprises one or more sensors configured to detect the aircraft status information, wherein the one or more sensors are configured to detect or measure a position of the aircraft, an attitude of the aircraft, an altitude of the aircraft, a speed of the aircraft, an acceleration of the aircraft, or atmospheric information outside the aircraft.

2. The aircraft of claim 1, wherein the one or more sensors comprise a speed sensor, an acceleration sensor, a gyro sensor, an altitude sensor, an atmospheric measurement sensor, a lidar sensor, a geomagnetic sensor, a global positioning system, an inertial navigation system, or a ground proximity warning system.

3. The aircraft of claim 1, wherein the external output device comprises an audio device configured to output the sound and a lighting device configured to output the light.

4. The aircraft of claim 3, wherein the audio device and the lighting device are disposed on a lower portion of an exterior of the fuselage.

5. The aircraft of claim 4, wherein:

the external output device further comprises a driving device coupling the audio device and the lighting device to the fuselage;

a direction of the audio device and a direction of the lighting device are adjusted based on driving of the driving device; and the controller is configured to transmit a control signal to the driving device to direct the audio device and the lighting device toward the expected emergency landing point.

6. The aircraft of claim 1, wherein the controller is configured to control delivery of the warning information to another aircraft located in a vicinity of the aircraft or to an external device located in an area of the expected emergency landing point.

7. The aircraft of claim 6, wherein the external device located in the area of the expected emergency landing point comprises a car driving in the area of the expected emergency landing point or a portable terminal device of a pedestrian walking in the area of the expected emergency landing point.

8. The aircraft of claim 1, wherein the aircraft body further comprises a wing system coupled to the fuselage.

9. A method of warning about an emergency landing point of an aircraft, the method comprising:

detecting aircraft status information;

determining whether an emergency landing situation exists based on the aircraft status information;

in response to a determination that the emergency landing situation exists, determining an expected emergency landing point based on the aircraft status information by the aircraft;

controlling an external output device to be directed toward the expected emergency landing point; and controlling output of warning information toward the expected emergency landing point using the external output device, wherein the aircraft status information comprises a location of the aircraft, an attitude of the aircraft, an altitude of the aircraft, a speed of the aircraft, an acceleration of the aircraft, and atmospheric information outside the aircraft.

10. The method of claim 9, wherein the warning information comprises a sound or a light.

11. The method of claim 9, wherein determining the expected emergency landing point comprises determining a predetermined position in which an emergency landing of the aircraft is expected in a current state, using the aircraft status information, in response to a confirmation that the aircraft is in the emergency landing situation.

12. The method of claim 9, further comprising:

transmitting the expected emergency landing point to an integrated control center; and transmitting the warning information to an external device or an external facility in a vicinity of the expected emergency landing point.

13. The method of claim 12, wherein transmitting the expected emergency landing point to the integrated control center is performed after the expected emergency landing point is determined and is performed independently of adjusting a direction of the external output device.

14. The method of claim 13, wherein transmitting the warning information to the external device or the external facility is performed by the integrated control center having received information about the expected emergency landing point from the aircraft.

15. The method of claim 14, wherein the external device or the external facility comprises another aircraft around the aircraft, a vehicle in the vicinity of the expected emergency landing point, a portable device of a pedestrian in the vicinity of the expected emergency landing point, or a warning facility in the vicinity of the expected emergency landing point.

16. A system for providing a warning about an emergency landing of an aircraft, the system comprising:

one or more sensors disposed in or on an aircraft body of the aircraft;

a controller disposed in or on the aircraft body and configured to:

determine whether an emergency landing situation exists based on aircraft status information detected or measured by the one or more sensors, wherein the aircraft status information comprises a position of the aircraft, an attitude of the aircraft, an altitude of the aircraft, a speed of the aircraft, an acceleration of the aircraft, or atmospheric information outside the aircraft; and determine an expected emergency landing point based on the aircraft status information in response to a determination that the emergency landing situation exists; and an external output device disposed on the outside of the aircraft body, directable toward the expected emergency landing point, and configured to output warning information toward the expected emergency landing point, wherein the warning information is output by the external output device as a sound warning or a light warning.

17. The system of claim 16, wherein the controller is further configured to transmit the expected emergency landing point to an integrated control center; and wherein the integrated control center is configured to transmit additional warning information to an external device or an external facility in a vicinity of the expected emergency landing point in response to receiving the expected emergency landing point.

18. The system of claim 17, wherein the external device or the external facility comprises another aircraft around the aircraft, a vehicle in the vicinity of the expected emergency landing point, a portable device of a pedestrian in the vicinity of the expected emergency landing point, or a warning facility in the vicinity of the expected emergency landing point.

19. The system of claim 16, wherein the controller being configured to determine the expected emergency landing point based on the aircraft status information further comprises the controller being configured to calculate a position at which an emergency landing of the aircraft is expected based on the aircraft status information.

20. The system of claim 16, wherein the controller is configured to (i) use surrounding information received from an external device or facility near the expected emergency landing point to secondarily designate a location where damage to a surrounding area may be minimized and (ii) guide an emergency landing to the designated location.

* * * * *